United States Patent
Nakamura (10) Patent No.: US 7,388,729 B2
(45) Date of Patent: Jun. 17, 2008

(54) MAGNETIC RECORDING DEVICE AND MEDIUM HAVING MASK PATTERN

(75) Inventor: Hiroaki Nakamura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/687,078

(22) Filed: Mar. 16, 2007

(65) Prior Publication Data

US 2007/0230016 A1 Oct. 4, 2007

(30) Foreign Application Priority Data

Mar. 28, 2006 (JP) .............................. 2006-089281

(51) Int. Cl.
G11B 5/596 (2006.01)
(52) U.S. Cl. .................................. 360/77.08
(58) Field of Classification Search ............. 360/77.08, 360/48, 75, 17, 125.43, 324, 135, 125.63; 428/826, 828, 836, 845.6; 204/192.12
See application file for complete search history.

(56) References Cited

U.S. PATENT DOCUMENTS

| | | | |
|---|---|---|---|
| 6,420,058 B1 * | 7/2002 | Haratani et al. | 428/845.6 |
| 6,590,729 B1 | 7/2003 | Akagi et al. | |
| 6,603,642 B1 * | 8/2003 | Araki et al. | 360/324 |
| 6,605,196 B2 * | 8/2003 | Sasaki | 204/192.12 |
| 6,639,763 B1 * | 10/2003 | Araki et al. | 360/324 |
| 6,646,828 B1 * | 11/2003 | Sasaki | 360/125.43 |
| 6,738,234 B1 * | 5/2004 | Araki et al. | 360/324 |
| 6,852,431 B2 * | 2/2005 | Fukutani et al. | 428/826 |
| 6,885,519 B2 * | 4/2005 | Sasaki | 360/125.63 |
| 7,106,544 B2 * | 9/2006 | Dugas et al. | 360/75 |
| 7,136,252 B2 * | 11/2006 | Tagami | 360/77.08 |
| 7,319,568 B2 * | 1/2008 | Okino et al. | 360/48 |
| 2005/0128632 A1 | 6/2005 | Nakamura et al. | |
| 2006/0007574 A1 | 1/2006 | Kojima et al. | |
| 2006/0014053 A1 | 1/2006 | Asakura et al. | |
| 2006/0139805 A1 * | 6/2006 | Akamatsu et al. | 360/135 |
| 2006/0152835 A1 * | 7/2006 | Bandic et al. | 360/17 |
| 2006/0154112 A1 * | 7/2006 | Bandic et al. | 428/828 |
| 2006/0172153 A1 * | 8/2006 | Kikitsu et al. | 428/826 |

(Continued)

FOREIGN PATENT DOCUMENTS

EP 1463038 3/2004

(Continued)

OTHER PUBLICATIONS

European Search Report dated Jul. 26, 2007.

(Continued)

*Primary Examiner*—Fred Tzeng
(74) *Attorney, Agent, or Firm*—Amin, Turocy & Calvin, LLP (57) ABSTRACT

A magnetic recording device includes a composite magnetic head, which includes a recording head and a reproduction head, and a magnetic recording medium. The magnetic recording medium includes a data region for recording data using the recording head, a mask pattern region in which an area in which servo information can be magnetically recorded and an area in which information cannot be magnetically recorded are formed in a predetermined pattern, and an initial positioning region in which a magnetic area and a nonmagnetic area that record information for positioning one of the recording head and the reproduction head in the mask pattern region.

15 Claims, 9 Drawing Sheets

U.S. PATENT DOCUMENTS

2006/0172155 A1* 8/2006 Okino et al. ............... 428/836
2007/0070547 A1* 3/2007 Kamata et al. ............. 360/135
2007/0070852 A1  3/2007 Nakamura et al.

FOREIGN PATENT DOCUMENTS

| JP | 07-065363 | 3/1995 |
|---|---|---|
| JP | 08-212733 | 8/1996 |
| JP | 2001-243611 | 9/2001 |
| KR | 1020010050786 | 6/2001 |
| WO | 0223538 | 3/2002 |

OTHER PUBLICATIONS

Korean Office Action dated Mar. 27, 2008 corresponding to U.S. Patent Application No. 11/687,078 filed on Mar. 16, 2007.

* cited by examiner

MAGNETIC RECORDING DEVICE AND MEDIUM HAVING MASK PATTERN

CROSS-REFERENCE TO RELATED APPLICATIONS

This application is based upon and claims the benefit of priority from the prior Japanese Patent Application No. 2006-89281, filed on Mar. 28, 2006; the entire contents of which are incorporated herein by reference.

BACKGROUND OF THE INVENTION

1. Field of the Invention

The present invention relates to a magnetic recording device that includes a magnetic storage medium that stores therein servo information, a magnetic recording medium, and a servo information recording method.

2. Description of the Related Art

To cope-up with the requirement of increasing the recording capacity of a computer, recently there has been a trend to increase the storage capacity of a magnetic recording device such as a hard disk drive (HDD) used in the computer. Higher storage capacity can be achieved by increasing the recording density of a magnetic recording device. To increasing the recording density, one approach is to reduce the size of the recording magnetic domain on a magnetic recording layer generated by a signal magnetic field using a magnetic head. As a recording method of this type, there is conventionally known the perpendicular magnetic recording (PMR).

The PMR is a method of recording information by magnetizing a magnetic material in a direction perpendicular to a recording surface of the recording layer of the magnetic recording medium. In the PMR, however, if information is recorded at ultra-high density equal to or higher than 100 Gbit/in$^2$, side fringes on side edges of a magnetic head, which records information on the magnetic recording medium, cause the magnetic head to wrongly perform a write operation on a track adjacent to the target track, resulting in a recording defect and a reproducing defect.

To take care of this issue, there has been proposed the discrete track recording (DTR) based on the PMR. In the DTR, magnetic regions and nonmagnetic regions are alternately formed on the recording layer in the direction perpendicular to the direction of radius of the magnetic recording medium. The magnetic regions are formed with a magnetic material, and data is recorded in the magnetic regions. The nonmagnetic regions are formed with a nonmagnetic material, and no data is recorded in the nonmagnetic regions. A nonmagnetic region is sandwiched between adjacent tracks. The DTR prevents data from being erroneously written on a track adjacent to the target track, and realize good recording and reproducing characteristics.

Meanwhile, there have been proposed a magnetic recording device that employs a composite head that includes two heads. The composite head includes a recording head and a reproduction head. A thin-film inductive head is employed as the recording head for writing data on the magnetic recording medium. A magnetoresistive head (MR head) is employed as the reproduction head for reading the data from the magnetic recording medium. In a magnetic recording device having a rotary drive structure, the composite head is supported on a tip end of a head actuator, and the composite head is controlled to be moved in a diameter direction of the composite head, i.e., a direction of traversing tracks of the magnetic recording medium so as to be positioned in a desired sector. A data region including the magnetic recording regions and the nonmagnetic regions, and a servo region are provided on the recording surface of the magnetic recording medium. In the servo region, position information such as track positions and sector positions is recorded at predetermined intervals in a track direction.

The data region of the magnetic recording medium includes first area and second areas. A surface of each of the first area is effective as a magnetic recording region. On the other hand, a surface of each of the second area is ineffective as a magnetic recording region. Each of the first area is convex, has a magnetic film on its surface, and serves as the magnetic region for recording information. Each of the second area is concave and serves as the nonmagnetic region in which no information is recorded. Namely, the second areas are constituted as the nonmagnetic regions because of their concave shape, although sometimes a magnetic film is formed on the surface of the second areas.

To record and reproduce information with high precision on and from a track of the data region of such a recording medium that can realize high-density recording, it is necessary to position the head on the track of the data region at high precision. This means that it is necessary to record servo information in the servo region at high precision. With the conventional technique, the servo information is recorded in the servo region using a servo information recording apparatus. Similarly to the data region, if the servo information is recorded at high precision and high density, side fringes are disadvantageously generated. As a result, it has become difficult to further narrow the pattern width.

As a conventional technique for recording the servo information at high precision, there is known a servo information recording technique as disclosed in JP-A H7-65363 (KOKAI). In this technique, an information region for follow-up control over the mask pattern (hereinafter, "follow-up control information region") is formed in the servo region that includes the magnetic film formed on a substrate. In the follow-up control information region, pits serving as the nonmagnetic regions are arranged in a direction of a track width of the data region. The servo information is recorded in a region between the adjacent pits. Due to such a structure, the influence of the side fringes can be lessened.

In the conventional technique, the mask pattern of the follow-up control information region is formed by, for example, irradiating a laser beam onto a base material, on which a photoresist is applied, to cut off the pattern into tracks using a cutting machine. Due to this, the tracks on the mask pattern depend on the properties of the cutting machine. To magnetically record the servo information into the mask pattern, it is necessary to appropriately position a recording head on the mask pattern while following up the form of tracks each formed by the cutting machine.

With the conventional technique, therefore, if tracks of the servo region are eccentrically fixed, it is necessary to employ a dedicated servo information recording apparatus that includes a fine-movement actuator such as a piezoelectric element that causes the recording head to make a fine movement so as to follow up the mask pattern.

If each track formed into the mask pattern by the cutting machine is in the form of a true circle, it is easy to move the recording head to follow up the mask pattern using the fine-movement actuator. However, if vibrations occur during cutting the pattern into the tracks using the laser beam, tracks with irregular shapes are formed. With the tracks having irregular shapes, it is difficult to move the recording head to follow up the mask pattern.

Furthermore, if the servo information is to be recorded on one recording medium, the servo information recording apparatus becomes busy for a long time. Moreover, if the recording density is high, the number of tracks considerably increases so that it takes still longer time to record the servo information using the servo information recording apparatus. To reduce processing time for manufacturing process of the recording medium, it is disadvantageously necessary to provide a plurality of servo information recording apparatuses.

Moreover, if a track pitch of the recording medium is narrower, the mask pattern is smaller. If so, higher positioning precision is required for positioning the recording head on the mask pattern using the servo information recording apparatus. This makes it further difficult to realize the servo information recording apparatus.

In this manner, with the servo information recording technique for the conventional magnetic recording medium, a plurality of dedicated or high-precision servo information recording apparatuses are often required to record the servo information with high precision.

SUMMARY OF THE INVENTION

According to an aspect of the present invention, a magnetic recording device includes a composite magnetic head that includes a recording head and a reproduction head; and a magnetic recording medium having a data region configured to store data, wherein the recording head records data in the data region; a mask pattern region having a first magnetic area and a first nonmagnetic area formed in a predetermined pattern, wherein servo information can be magnetically recorded in the first magnetic area and information cannot be magnetically recorded in the first nonmagnetic area; and an initial positioning region having a second magnetic area and a second nonmagnetic area, wherein information for positioning at least one of the recording head and the reproduction head at a desired location in the mask pattern region is stored in the second magnetic area.

According to another aspect of the present invention, a magnetic recording medium includes a data region configured to store data, wherein a recording head records data in the data region; a mask pattern region having a first magnetic area and a first nonmagnetic area formed in a predetermined pattern, wherein servo information can be magnetically recorded in the first magnetic area and information cannot be magnetically recorded in the first nonmagnetic area; and an initial positioning region having a second magnetic area and a second nonmagnetic area, wherein information for positioning at least one of the recording head and a reproduction head at a desired location in the mask pattern region is stored in the second magnetic area.

According to still another aspect of the present invention, a servo information recording method includes positioning a reproduction head in an initial positioning region of a magnetic recording medium, the magnetic recording medium including a data region configured to store data, wherein a recording head records data in the data region; a mask pattern region having a first magnetic area and a first nonmagnetic area formed in a predetermined pattern, wherein servo information can be magnetically recorded in the first magnetic area and information cannot be magnetically recorded in the first nonmagnetic area; and an initial positioning region having a second magnetic area and a second nonmagnetic area, wherein information for positioning at least one of the recording head and a reproduction head at a desired location in the mask pattern region is stored in the second magnetic area; reading information on the initial positioning region, and generating a reproduced signal using the reproduction head positioned in the initial positioning region; positioning the recording head in the mask pattern region based on the reproduced signal generated in the initial positioning region; and recording the servo information in the mask pattern using the recording head positioned in the mask pattern region.

DETAILED DESCRIPTION OF THE INVENTION

Exemplary embodiments of the present invention will be explained below in detail with reference to the accompanying drawings.

In a first embodiment, a hard disk drive (HDD) that includes a hard disk (HD) serving as a magnetic recording medium, the HD, and servo information recording using a composite magnetic head in the HDD will be explained as a magnetic recording device, a magnetic recording medium, and a servo information recording method according to the present invention, respectively.

The HD is the magnetic recording medium configured to include a mask pattern region, an initial positioning region, and a burst preamble region per sector of each track.

Figure 1:
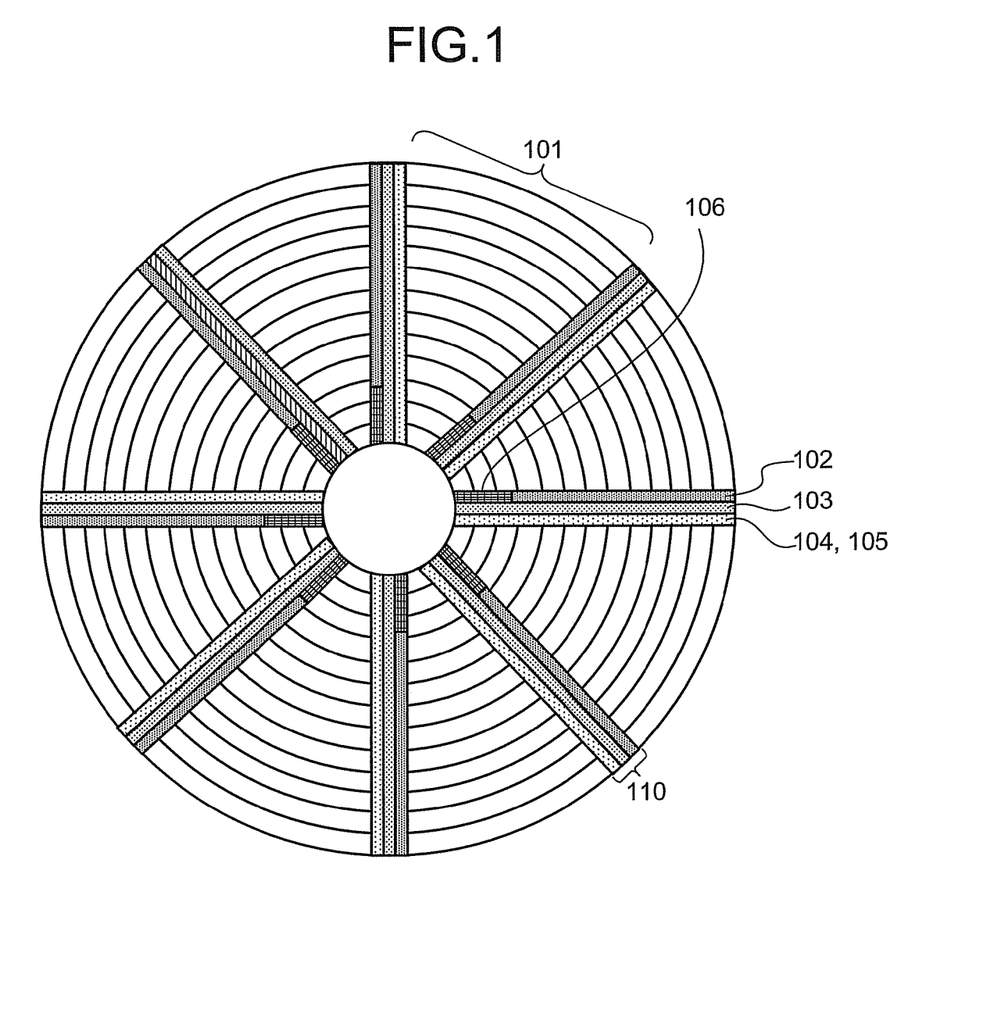
FIG. 1 is a plan view of a hard disk according to a first embodiment of the present invention.

FIG. 1 is a plan view of the HD according to the first embodiment. The HD includes a plurality of data regions 101 in which data can be recorded and a plurality of servo regions 110 in which servo information is recorded. Each servo region 110 includes a mask pattern region 102, an initial positioning region 106, a burst preamble region 103, an address region 104, and a preamble region 105.

The mask pattern region 102, the burst preamble region 103, the address region 104, and the preamble region 105 are provided in a diameter direction of the HD. The initial positioning region 106 is situated inward of an innermost track of the mask pattern region 102 and has a length equal to two tracks. However, the position and length of the initial positioning region 106 are not limited to what has been shown in FIG. 1. For example, the initial positioning region 106 may be provided outward of the innermost track of the mask pattern region 102. Moreover, the length of the initial positioning region 106 can be one track or more than two tracks. For convenience, FIG. 1 depicts the address region 104 and the preamble region 105 provided as one region.

Figure 2:
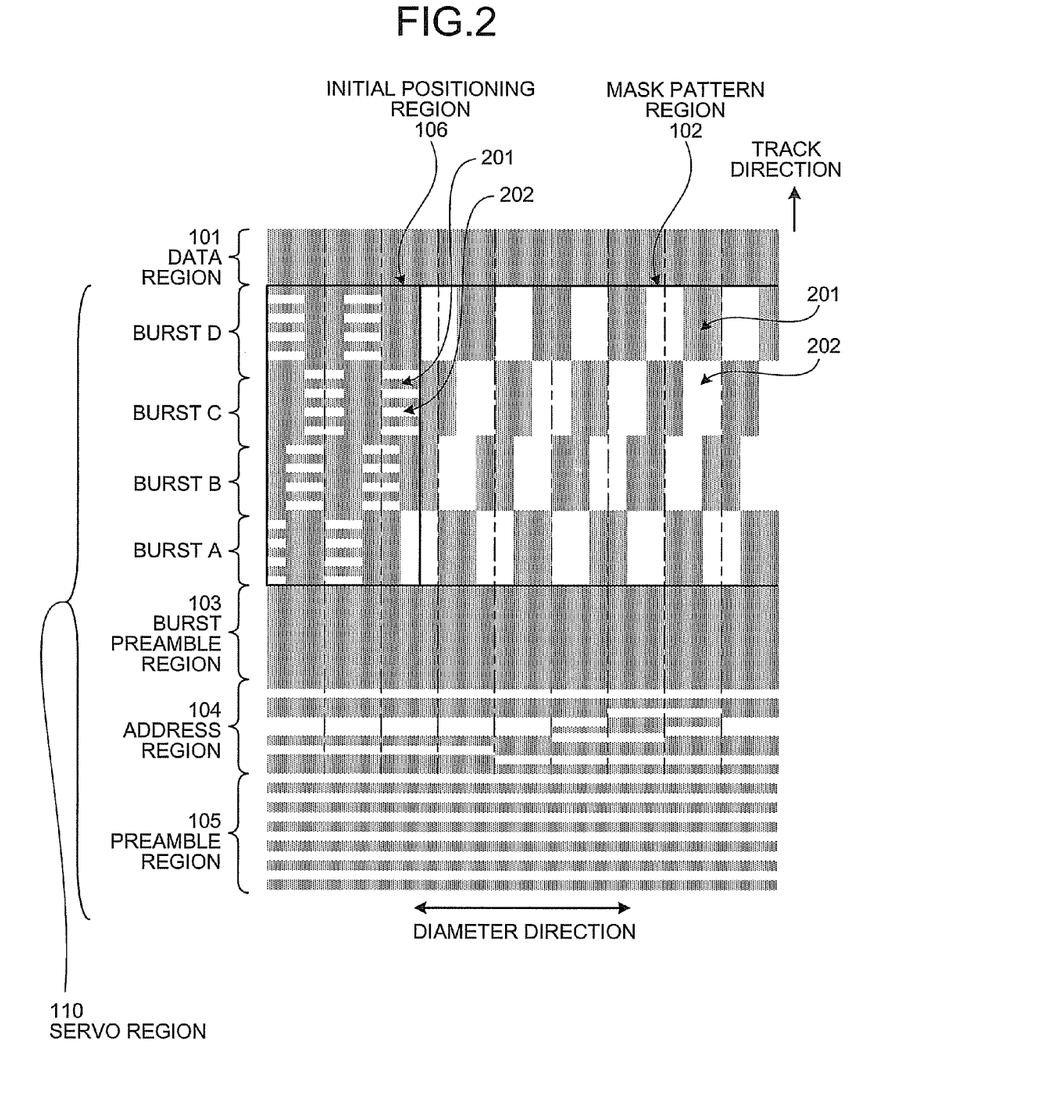
FIG. 2 is an enlarged schematic of a data region and a servo region of the hard disk shown in FIG. 1.

FIG. 2 is an enlarged schematic of the data region 101 and the servo region 110. In FIG. 2, a broken line indicates a track center of a corresponding track.

The mask pattern region 102 is a region in which a mask pattern is formed. The mask pattern region 102 includes a plurality of magnetic areas 201 and a plurality of nonmagnetic areas 202. In the magnetic areas 201, a burst signal indicative of servo information can be magnetically recorded. In the nonmagnetic areas 202, no burst signal can be recorded. As shown in FIG. 2, the mask pattern in the mask pattern region 102 which pattern includes the magnetic areas 201 and the nonmagnetic areas 202 is a conventional ABCD burst servo pattern. Each of burst areas A, B, C, and D include the magnetic areas 201 and the nonmagnetic areas 202. The burst area B is shifted in phase from the burst area A by 180 degrees. The burst area C is shifted in phase from both the burst areas A and B by 90 degrees. The burst area D is shifted in phase from both the burst areas A and B by 90 degrees. Two nonmagnetic areas 202 are adjacent to both sides of each magnetic area 201 in each of the burst areas A, B, C, and D, respectively. By so arranging, the mask pattern is formed in the mask pattern region 102. The width of each pattern in narrower than a recording width of the recording head.

Figure 5:
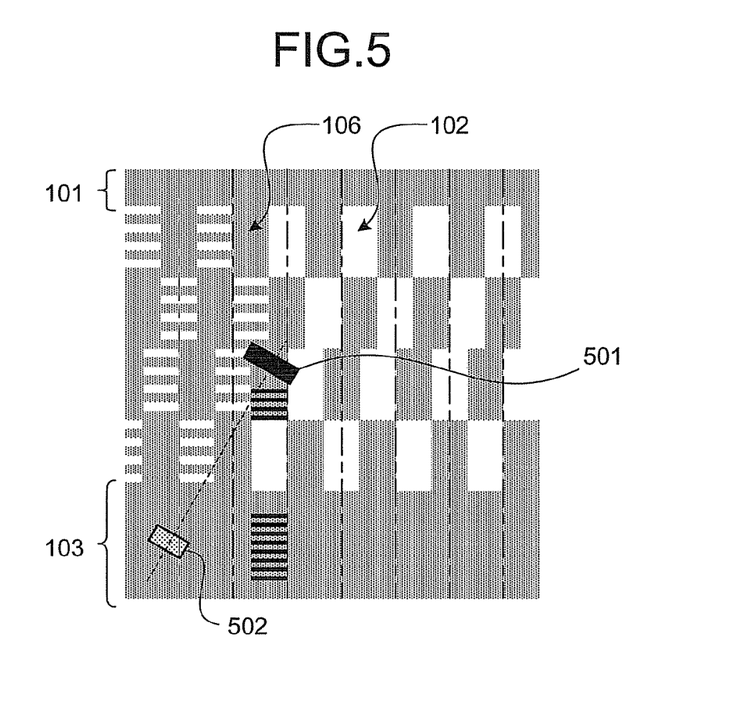
FIG. 5 is an enlarged schematic for explaining an operation of a head and a state of recording servo information in a mask pattern region when the servo information recording processing is started.

The initial positioning region 106 stores therein a burst signal for positioning a recording head 501 (see FIG. 5) or a reproduction head 502 on a target track of the mask pattern region 102 (see FIG. 5). In the initial positioning region 106, the magnetic areas 201 and the nonmagnetic areas 202 are formed in the same servo burst pattern as that of the mask pattern region 102 to correspond to the mask pattern of the mask pattern region 102. Accordingly, similarly to the mask pattern region 102, the mask pattern in which the magnetic areas 201 and the nonmagnetic areas 202 are arranged into the burst servo pattern in the initial positioning region 106. Each of the burst areas A, B, C, and D includes the magnetic areas 201 and the nonmagnetic areas 202. The burst area B is shifted in phase from the burst area A by 180 degrees. Each of the burst areas C and D is shifted in phase from the burst areas A and B.

In the first embodiment, the initial positioning region 106 occupies two tracks as shown in FIGS. 1 and 2. The burst pattern on the two tracks corresponds to the mask pattern on the two inner circumferential tracks of the mask pattern region 102.

The burst preamble region 103 is a region consisting of a continuous magnetic material for recording a synchronization signal to be synchronized with a processing for reproducing the burst signal recorded in the mask pattern region 102.

Figure 3:
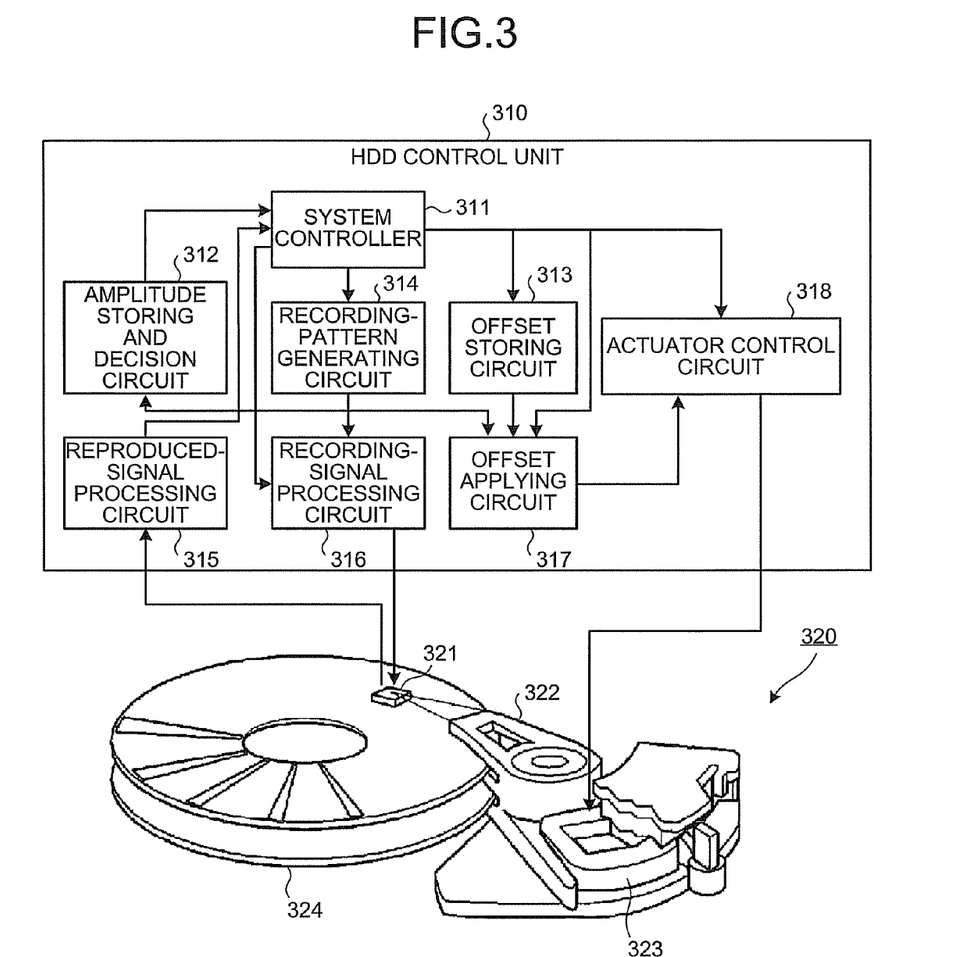
FIG. 3 is a block diagram of a hard disk drive according to the first embodiment that includes the hard disk shown in FIG. 1.

FIG. 3 is a block diagram and a perspective of the HDD according to the first embodiment that includes the hard disk shown in FIG. 1. The HDD includes at least one HD 324, a composite magnetic head 321, a driving mechanism 320, and an HDD control unit 310. The composite magnetic head 321 includes the recording head 501 and the reproduction head 502. The driving mechanism 320 includes a suspension arm 322 and a positioning actuator 323. The HDD control unit 310 is provided on a printed circuit board (not shown) inside the HDD.

As shown in FIG. 3, the HDD control unit 310 includes a system controller 311, an offset storing circuit 313, a recording-pattern generating circuit 314, a reproduced-signal processing circuit 315 (a reproducing unit), a recording-signal processing circuit 316 (a recording unit), an amplitude storing and decision circuit 312 (a positioning unit), an offset applying circuit 317 (the positioning unit), and an actuator control circuit 318 (the positioning unit).

The amplitude storing and decision circuit 312 stores an amplitude of each reproduced signal generated by the reproduction head 502, and decides a maximum amplitude. The offset storing circuit 313 stores the maximum amplitude on each track as an optimum read-write offset amount that indicates a relative distance between the reproduction head 502 and the recording head 501 in a diameter direction of the HD 324.

The recording-pattern generating circuit 314 generates a recording pattern of the data to be written to the HD 324. The actuator control circuit 318 performs positioning of the reproduction head 502 and the recording head 501. Specifically, the actuator control circuit 318 receives the optimum offset amount from the offset applying circuit 317 when the recording head 501 is to record information on a predetermined track of the mask pattern region 102. The actuator control circuit 318 moves the composite magnetic head 321 in the diameter direction of the HD 324 by a distance that is a sum of the optimum offset amount and a distance obtained by multiplying the number of tracks of the initial positioning region 106 by a track width. The reproduced-signal processing circuit 315 receives the reproduced signal from the reproduction head 502, and feeds the reproduced signal to the system controller 311. The recording-signal processing circuit 316 records a signal corresponding to the recording pattern generated by the recording-pattern generating circuit 314 in the HD 324 using the recording head 501. The offset applying circuit 317 transmits the optimum offset amount stored in the offset storing circuit 313 to the actuator control circuit 318.

The system controller 311 controls the amplitude storing and decision circuit 312, the offset storing circuit 313, the recording-pattern generating circuit 314, the reproduced-signal processing circuit 315, the recording-signal processing circuit 316, and the offset applying circuit 317.

Figure 4:
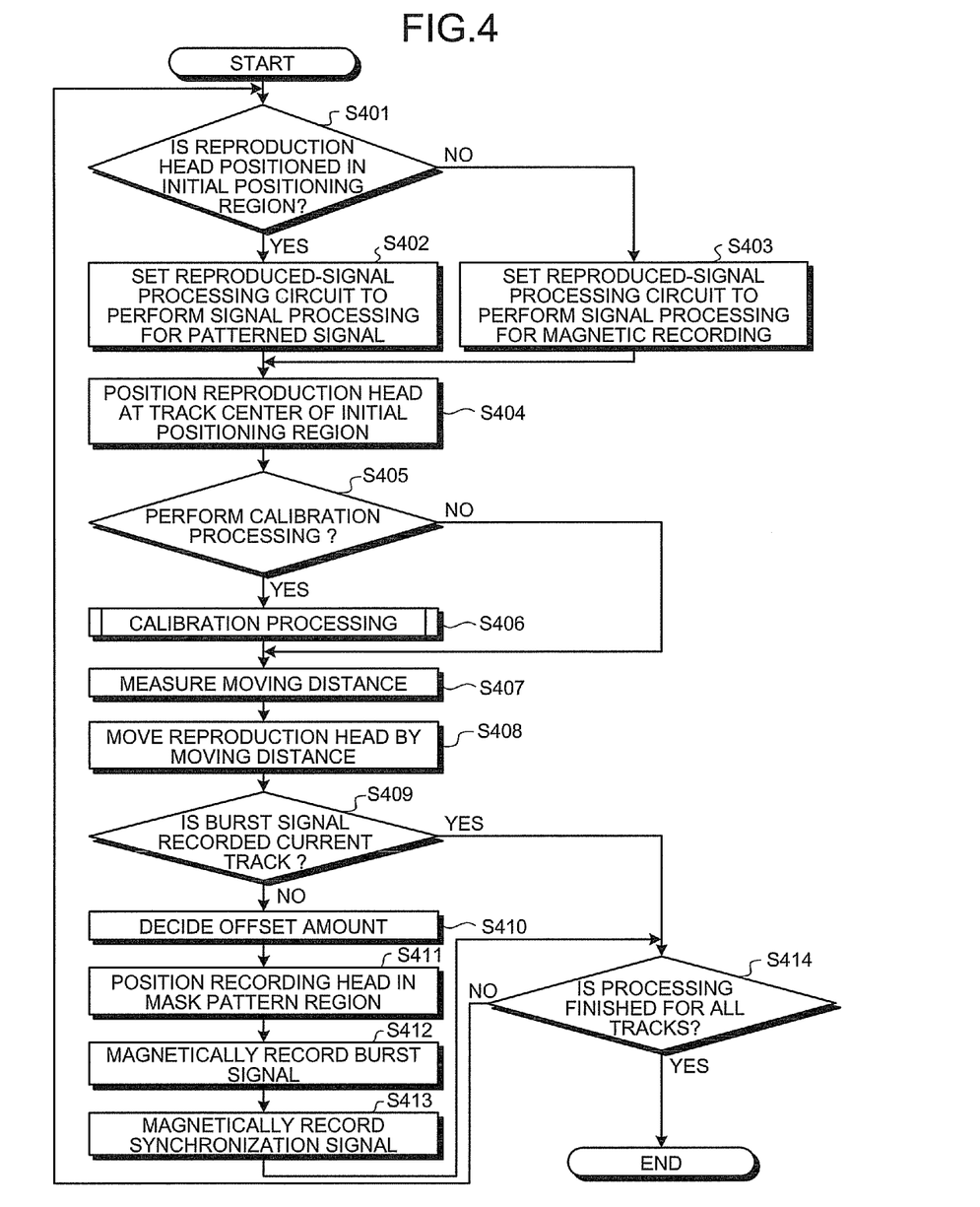
FIG. 4 is a flowchart of a servo information recording processing according to the first embodiment.
Figure 6:
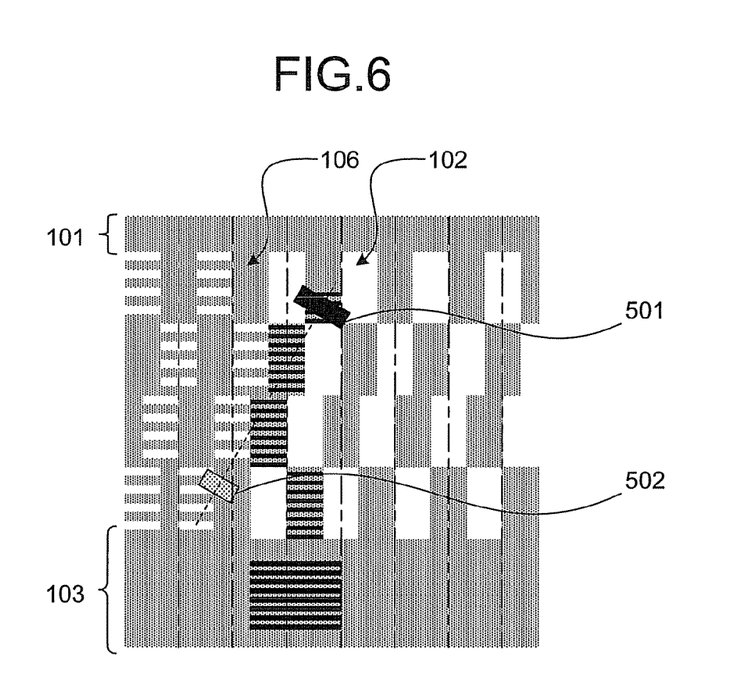
FIG. 6 is an enlarged schematic for explaining an operation of the head and a state of recording the servo information in the mask pattern region if the servo information recording processing is performed using a pattern of an initial positioning region.
Figure 7:
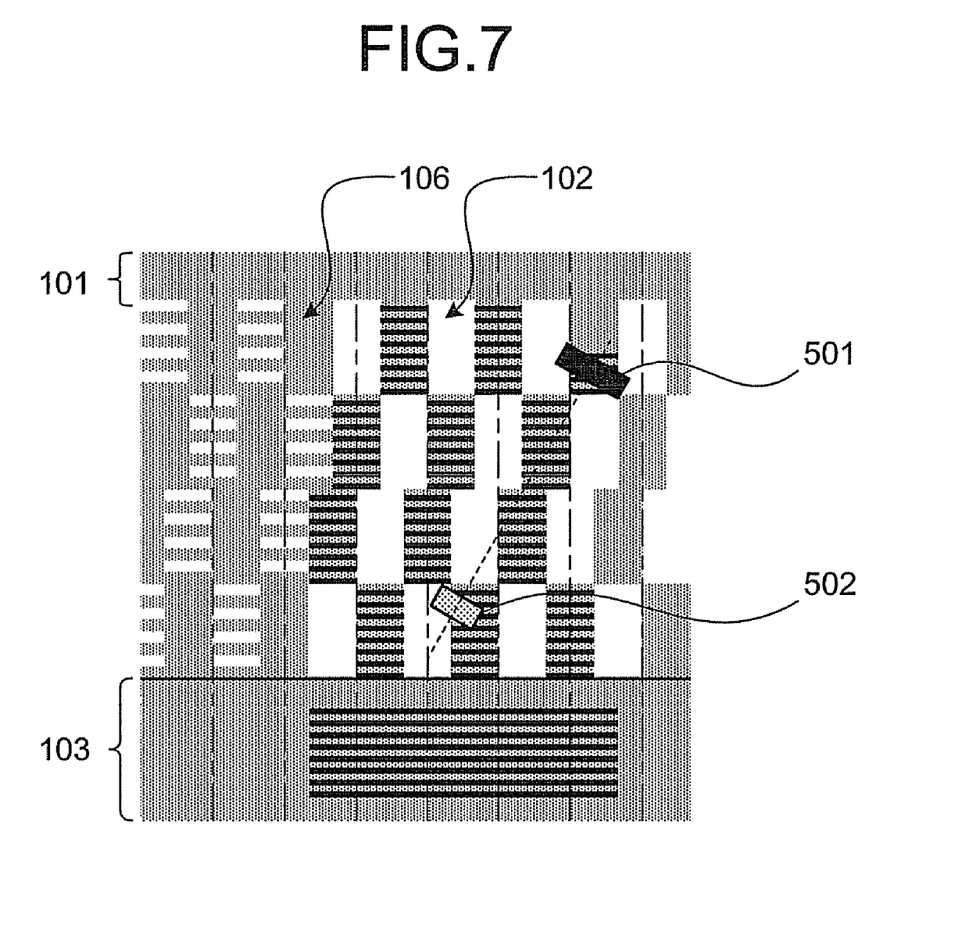
FIG. 7 is an enlarged schematic for explaining an operation of the head and a state of recording the servo information in the mask pattern region if the servo information recording processing is performed without using the pattern of the initial positioning region.

FIG. 4 is a flowchart of a procedure of a servo information recording processing performed by the HDD according to the first embodiment. FIGS. 5, 6, and 7 are schematics for explaining operations of the composite magnetic head 321 and states of recording servo information in the mask pattern region 102 in the servo information recording processing.

The reproduced-signal processing circuit 315 determines whether the reproduction head 502 is currently positioned in the initial positioning region 106 (step S401). As shown in FIG. 5, the servo information processing according to the first embodiment is started in a state that no information is recorded in the burst preamble region 103 and the mask pattern region 102. In this state, the suspension arm 322 that supports the composite magnetic head 321, which includes the reproduction head 502 and the recording head 501, is moved to an initial position according to patterned address information recorded in the address region 104 (see FIG. 2).

If the reproduction head 502 is currently positioned in the initial positioning region 106 (Yes at step S401), then the reproduced-signal processing circuit 315 is set to perform a signal processing of the burst signal, which is a single that has been patterned in the burst servo pattern by the magnetic areas 201 and the nonmagnetic areas 202 in the initial positioning region 106 (step S402). As a result, the reproduced-signal processing circuit 315 reads the burst servo pattern of the initial positioning region 106 synchronously with the preamble signal recorded in the preamble region 105. The system controller 311 controls the actuator control circuit 318 to displace the positioning actuator 323, and to position the reproduction head 502 at a central position of the target track (step S404). An instance in which the reproduced-signal processing circuit 315 determines that the reproduction head 502 is not currently positioned in the initial positioning region 106 (No at step S401) will be explained later.

The system controller 311 determines whether to perform a calibration processing for calculating the relative distance between the reproduction head 502 and the recording head 501 in the diameter direction of the HD 324 (step S405). If the system controller 311 determines to perform the calibration processing (Yes at step S405), the offset storing circuit 313 performs the calibration processing (step S406). The offset storing circuit 313 calculates the optimum read/write offset amount ("optimum offset amount") that corresponds to the relative distance between the reproduction head 502 and the recording head 501 in the diameter direction of the HD 324. The calibration processing will be explained later in detail.

After the optimum read/write offset amount (optimum offset amount) is calculated by the calibration processing, the actuator control circuit 318 calculates a moving distance for moving the reproduction head 502 to the center of a track of the mask pattern region 102, which track corresponds to the present track of the initial positioning region 106 (step S407).

As shown in FIG. 2, the initial positioning region 106 covers two tracks. The burst servo pattern on each of the two tracks corresponds to the two inner circumferential tracks of the mask pattern region 102. Due to this, if the reproduction head 502 is positioned at the center of an inner circumferential track out of the two tracks covered by the initial positioning region 106, the reproduction head 502 is moved by as much as two tracks, which are as many as the tracks covered by the initial positioning region 106, to a center of an inner circumferential track of the mask pattern region 102. If the reproduction head 502 is positioned at the center of an outer circumferential track out of the two tracks covered by the initial positioning region 106 (on a second track from the inner circumference of the initial positioning region 106), the reproduction head 502 is moved by as much as two tracks, which are as many as the tracks covered by the initial positioning region 106, to a center of an outer circumferential track of the mask pattern region 102 (to a second track from the inner circumference of the mask pattern region 102). Therefore, if the width of each track in the diameter direction of the HD 324 is known in advance, the moving distance of the reproduction head 502 to the center of the target track of the mask pattern region 102 can be calculated. Moreover, the actuator control circuit 318 controls the positioning actuator 323 to move the reproduction head 502 by the moving distance to the center of the target track of the mask pattern region 102 (step S408). The reproduction head 502 is thereby moved to the center of the track of the mask pattern region 102 corresponding to the track on which the burst signal is reproduced in the initial positioning region 106.

The reproduced-signal processing circuit 315 reproduces information at a position of the track of the mask pattern region 102 at which the reproduction head 502 is currently positioned, and determines whether the burst signal has been recorded at the present position (step S409). If the burst signal has not been recorded at the present position (No at step S409), the offset applying circuit 317 reads the optimum offset amount thus measured by the calibration processing from the offset storing circuit 313 (step S410). In addition, the offset applying circuit 317 outputs the offset amount to the actuator control circuit 318.

The actuator control circuit 318 controls the recording head 501 to be moved by a distance corresponding to the optimum offset amount output from the offset applying circuit 317 in the diameter direction of the HD 324 (step S411). In addition, the recording-signal processing circuit 316 magnetically records a burst signal at a position of the center of the track at which the recording head 501 is positioned (step S412). Thereafter, the actuator control circuit 318 and the positioning actuator 323 control the recording head 501 to be moved to the burst preamble region 103 on the same track as that on which the burst signal is recorded. In addition, the recording head 501 records a synchronization signal on the track of the burst preamble region 103 (step S413). FIG. 6 depicts a state in which the burst signal is recorded in the mask pattern region 102 and in which the synchronization signal is recorded in the burst preamble region 103.

If the reproduced-signal processing circuit 315 determines that the burst signal is already recorded at the present position in the mask pattern region 102 at which the reproduction head 502 is positioned (Yes at step S409), procedures for recording the burst signal and the synchronization signal from steps S410 to S413 are not performed.

The processing from steps S410 to S413 is executed repeatedly for all tracks (step S414). It is to be noted that the initial positioning region 106 covers only a few tracks (two tracks in the first embodiment) of the inner circumferential tracks. For this reason, if the recording of the burst signal is repeatedly executed on all the tracks in the mask pattern region 102, the positioning of the reproduction head 502 cannot be performed based on the burst servo pattern of the initial positioning region 106 on tracks of the mask pattern region 102 which tracks do not correspond to the tracks of the initial positioning region 106 (which tracks correspond to a third and subsequent tracks from the inner circumference of the mask pattern region 102).

Nevertheless, the burst signal already magnetically recorded in the mask pattern region 102 is recorded subsequently with the pattern of the initial positioning region 106. Due to this, after the reproduction head 502 is moved from the initial positioning region 106 to the mask pattern region 102, that is, if it is determined at step S401 that the reproduction head is not present in the initial positioning region 106 (No at step S401), the reproduction processing performed by the reproduced-signal processing circuit 315 is set to perform a signal processing for magnetic recording (step S403). It is thereby possible to continue positioning of the reproduction head 502.

If the reproduction processing performed by the reproduced-signal processing circuit 315 is set to the signal processing for the magnetic recording (step S403), then the reproduction processing for reproducing the address signal is set to the signal processing for the patterned signal in the address region 104 and that for reproducing the burst signal is set to the signal processing for the magnetically recorded signal. Accordingly, in the first embodiment, the synchronization signal for processing the magnetically recorded signal is recorded in the burst preamble region 103 at step S413, and the burst signal magnetically recorded in the mask pattern region 102 is synchronized with the synchronization signal.

In this manner, as shown in FIG. 7, the recording head 501 can be positioned even on the track of the mask pattern region 102 that have not been covered by the initial positioning region 106 by using the magnetically recorded burst signal. In addition, the recording head 501 can magnetically record a burst signal on the track.

Figure 8:
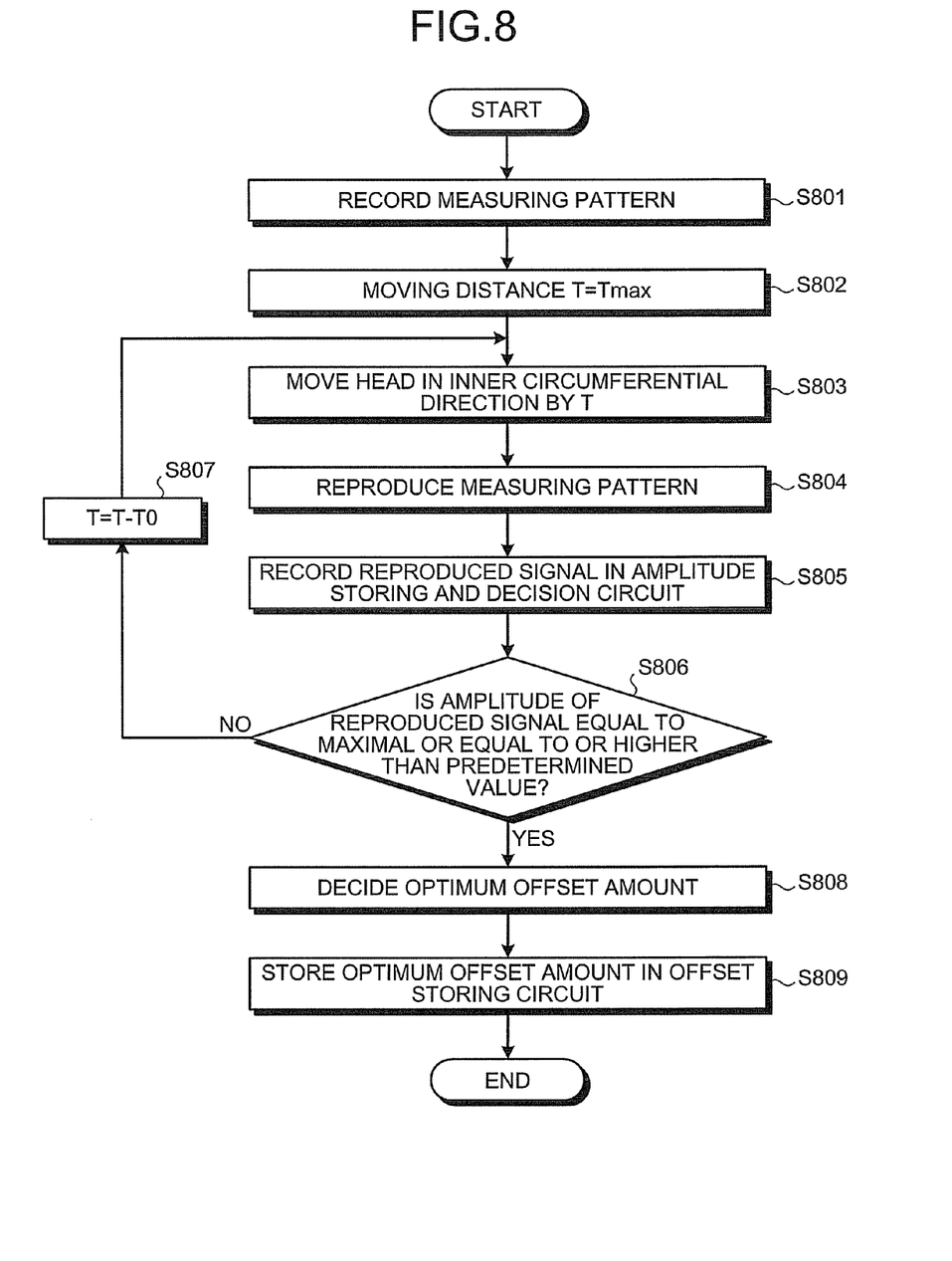
FIG. 8 is a flowchart of a calibration processing performed by an offset storing circuit shown in FIG. 3.

The calibration processing at step S406 will be explained in detail now. FIG. 8 is a flowchart of a procedure of the calibration processing.

The recording head 501 records a measuring pattern in the data region 101 while the reproduction head 502 is positioned at the center of the track of the initial positioning region 106 (step S801). The suspension arm 322 initializes distance T, which indicates the moving distance of the composite magnetic head 321 in the diameter direction of the HD 324, to a measurement initialization distance Tmax (step S802).

The composite magnetic head 321 is moved from the central position of the track indicated by the reproduction head 502 by the distance T (which is equal to the Tmax initially) in an inner circumferential direction (step S803). The reproduction head 502 reproduces the measuring pattern recorded in the data region 101 (step S804). The reproduced signal generated at this time is stored, as amplitude data when the offset amount that is an offset amount from the center corresponds to the T in the inner circumferential direction, in the amplitude storing and decision circuit 312 (step S805). The amplitude storing and decision circuit 312 compares the amplitude of a previous offset amount stored therein with the amplitude of the present offset amount. In addition, the amplitude storing and decision circuit 312 determines whether the amplitude of the reproduced signal is maximal or equal to higher than a predetermined value (step S806). If the result of the determination is NO, a preset measurement unit distance TO is subtracted from the distance T, that is, T is set to T−TO (T=T−TO) (step S807). Subsequently, the processing from step S803 to step S805 is repeatedly performed. As a result, the composite magnetic head 321 is turned from the state in which the composite magnetic head 321 is moved by the distance T in the inner circumferential direction of the HD 324 to the state in which the composite magnetic head 321 is moved by the distance TO in the outer circumferential direction of the composite magnetic head 321. In addition, measurement of the offset amount from step S803 to step S805 is executed.

Figure 9:
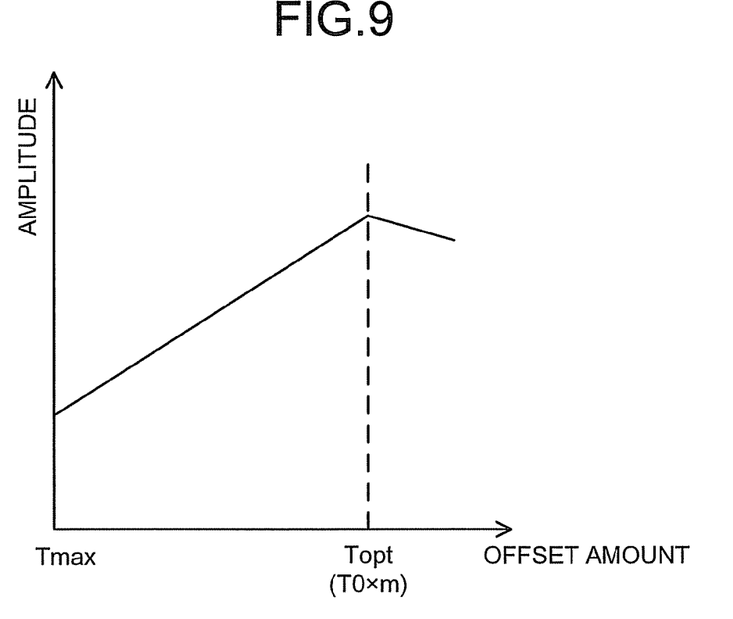
FIG. 9 is a graph of offset amount versus amplitude.

Data on the amplitude relative to the offset amount thus obtained can be expressed as a graph that represents the relationship between the offset amount and the amplitude as shown in FIG. 9. As shown in FIG. 9, if the offset amount is gradually changed from the Tmax in the inner circumferential direction of the HD 324 to the direction of the outer circumferential direction of the HD 324, the measurement can be finished when the offset amount with an inflection with which the measured amplitude reaches the maximal is obtained or the amplitude is equal to or higher than the predetermined value. The amplitude storing and decision circuit 312 detects the offset amount with which the amplitude is equal to the maximal or equal to or higher than the predetermined value for the first time based on the data thus stored. That is, the composite magnetic head 321 is gradually moved in the outer circumferential direction each by the distance TO, and the position with the offset amount with which the amplitude is detected as the maximal corresponds to the position of the center of the track.

Therefore, when the amplitude storing and decision circuit 312 determines at step S806 that the amplitude of the reproduced signal that indicates the present offset amount is the maximal or equal to or higher than the predetermined value, the amplitude storing and decision circuit 312 determines that the present offset amount is the optimum offset amount Topt for the track on which the processing is being performed (step S808). The amplitude storing and decision circuit 312 stores that offset amount in the offset storing circuit 313 (step S809).

The method of measurement of the optimum offset amount is not limited to the method explained above. Any other method can be adopted as long as the method is applied to an ordinary magnetic recording device.

Figure 10:
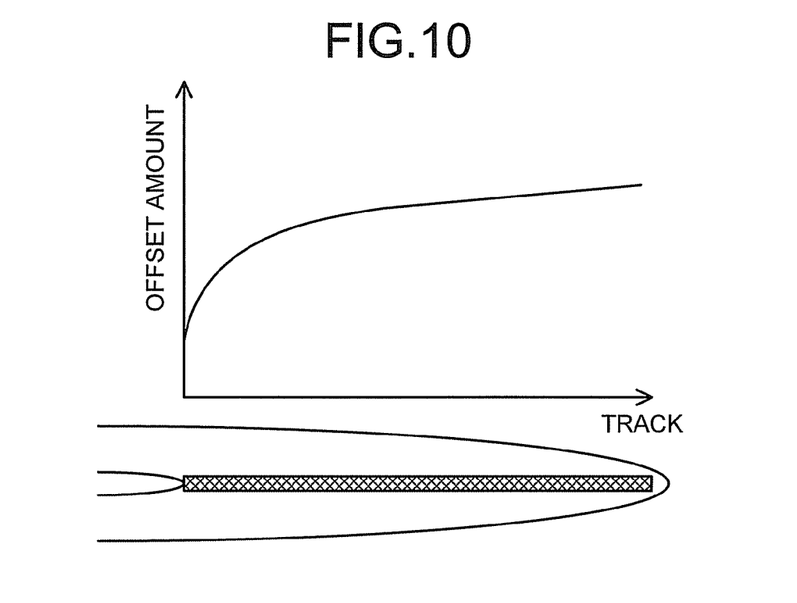
FIG. 10 is an example of an approximation curve.

In the servo information recording processing, an angle of the suspension arm 322 changes when the target track is located closer to the outer circumference, whereby the skew angle of the composite magnetic head 321 also changes. As a result, a relative positional relationship between the reproduction head 502 and the recording head 501 changes and the read/write offset amount also changes. Due to this, the relative positional relationship measured in the initial positioning region 106 cannot be continuously used. However, as shown in FIG. 10, an approximation curve of the offset amount relative to the track can be normally obtained from a geometric arrangement between the suspension arm 322 and the composite magnetic head 321. Therefore, an approximation function for setting the optimum offset amount measured by the calibration processing in the initial positioning region 106 as an initial offset can be obtained. By interpolating the approximation curve according to the approximation function, the optimum offset amount for positioning the recording head 501 in the mask pattern region 102 at the position at which the arm angle of the suspension arm 322 is decided.

Moreover, to relax an estimation error of the optimum offset amount, a calibration processing for correcting the approximation curve based on the measurement of the optimum offset amount made in the initial positioning region 106 can be performed whenever burst signals are magnetically recorded on a predetermined number of tracks of the mask pattern region 102. The calibration processing can be performed for every track. However, because the optimum offset amount is substantially equal among adjacent tracks, it suffices to execute the calibration processing at intervals of predetermined regions or the like. This can reduce operation time.

The burst signal recorded in the initial positioning region 106 is compared with that recorded in the mask pattern region 102. According to the comparison, the pattern of the initial positioning region 106 causes magnetization depending on presence of magnetism. Due to this, the burst signal recorded in the initial positioning region 106 is lower in amplitude than the reproduced signal of the burst signal magnetically recorded in the mask pattern region 102 with magnetization NS. It is, therefore, considered that an S/N ratio of the burst signal is low and the low S/N ratio possibly causes deterioration in positioning precision.

However, the mask pattern region 102 is configured so that the nonmagnetic areas 202 are located on both sides of each magnetic area 201, so that the magnetic area 201 is narrower than the recording head 501. Therefore, even if the positioning precision is low when the recording head 501 is positioned in the initial positioning region 106, a high-quality burst signal can be recorded in the mask pattern region 102. Burst signals can be, therefore, continuously recorded in the mask pattern region 102. Nevertheless, it is preferable that tracks used by a user as tracks of the HD of the HDD are limited to those on which the burst signals are recorded in the mask pattern region 102 in view of the possible adverse influence of the positioning precision on an error rate of the data region 101.

As explained so far, according to the first embodiment, the HD 324 of the HDD includes the mask pattern region 102 and the initial positioning region 106. In the mask pattern region 102, the magnetic areas 201 in each of which the burst signal can be magnetically recorded and the nonmagnetic areas 202 in each of which no burst signal can be magnetically recorded are arranged into the mask pattern that is the burst servo pattern. In the initial positioning region 106, the magnetic areas 201 in each of which burst signal is reproduced and the nonmagnetic areas 202 in each of which no burst signal is reproduced are arranged into the same burst pattern as that of the mask pattern region 102 to correspond to the mask pattern of the mask pattern region 102. The recording head 501 is positioned in the mask pattern region 102 based on the pattern of the initial positioning region 106, and burst signals are magnetically recorded in the mask pattern region 102. Because each magnetic area 201 is surrounded by the nonmagnetic areas 201 in the mask pattern region 102, the influence of side fringes can be lessened. In addition, the burst signals corresponding to a narrow track pitch can be recorded.

Furthermore, the initial positioning region 106 and the mask pattern region 102 are formed by the same manufacturing method. Therefore, even if a cutting machine using, for example, a laser beam is employed, the shapes of the tracks of both the initial positioning region 106 and the mask pattern region 102 become identical. Therefore, if tracking is executed in the initial positioning region 106, burst signals can be recorded in the mask pattern region 102 to follow up the track form. This makes it possible to sequentially perform positioning of the recording head 501 based on the recorded burst signals and to magnetically record burst signals using the recording head 501. It is thereby possible to accurately record burst signals on all the tracks.

Moreover, the servo information can be recorded using the HDD that includes the reproduction head 502, the recording head 501, the positioning actuator 323, the signal processing circuits 315 and 316 and the like. It is, therefore, unnecessary to employ any dedicated servo information recording apparatus, and it is possible to prevent deterioration in the productivity of the HDD.

A data region of an HD according to a second embodiment includes a data region that is formed as a discrete region, and an HDD according to the second embodiment records servo information in the HD.

Figure 11:
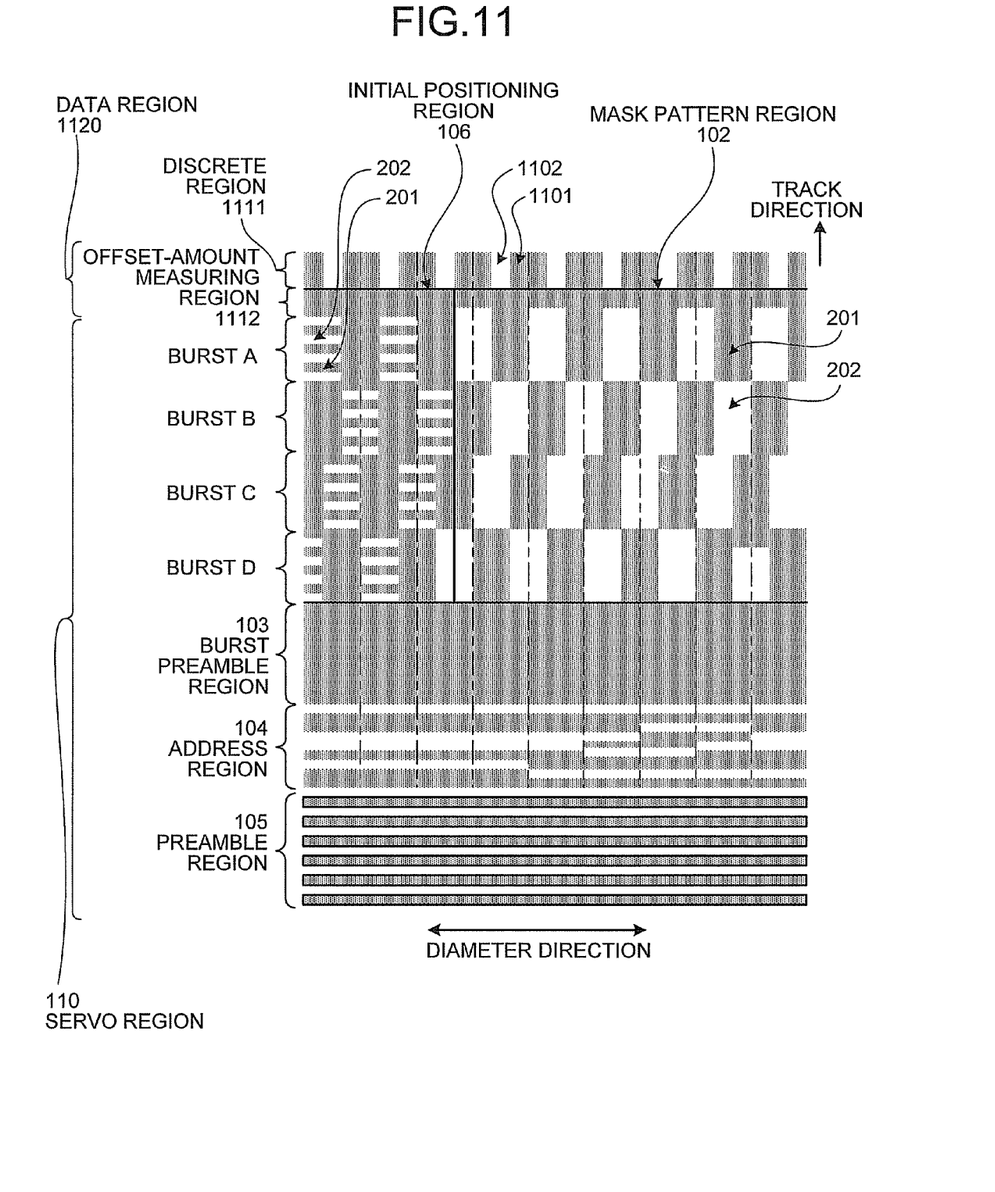
FIG. 11 is an enlarged schematic of a detailed configuration of a discrete region and a servo region of a hard disk according to a second embodiment of the present invention.

FIG. 11 is an enlarged schematic of a discrete region 1111 of a data region 1120 and the servo region 110 in the HD according to the second embodiment. In FIG. 11, each broken line indicates the track center of each track. In the second embodiment, the data region 1120 includes the discrete track type region ("discrete region") 1111 in which a nonmagnetic area 1102 is interposed between magnetic areas, i.e., recording areas 1101 on each track. Each sector of the track includes the servo region 110 and the data region 1120 that includes the discrete region 1111 and an offset-amount measuring region 1112.

The discrete region 1111 includes the recording areas 1101 that is magnetic areas in each of which data can be recorded and the nonmagnetic area 1102 in each of which no data can be recorded and which is interposed between the recording areas 1101. The servo region 110 is identical in configuration to that of the HD 324 according to the first embodiment.

In the second embodiment, the offset-amount measuring region 1112 consisting of a continuous magnetic material is provided between the discrete region 1111 and the servo region 110 in the diameter direction of the HD.

In the HDD according to the second embodiment, when the actuator control circuit 318 executes the calibration processing for measuring the read/write offset amount (optimum offset amount), the recording head 501 records a measuring pattern of the offset-amount measuring region 1112 at step S801 shown in FIG. 8. At step S804, the reproduction head 502 reproduces the measuring pattern recorded in the offset-amount measuring region 1112. By having such a configuration, even the discrete track type HD that includes the nonmagnetic areas in which no data can be recorded and each of which is provided between the recording units 1101 can accurately measure the read/write offset amount (optimum offset amount) that indicates the relative distance between the reproduction head 502 and the recording head 501.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic recording device comprising:
    a composite magnetic head that includes a recording head and a reproduction head; and
    a magnetic recording medium having
        a data region configured to store data, wherein the recording head records data in the data region;
        a mask pattern region having a first magnetic area and a first nonmagnetic area formed in a predetermined pattern, wherein servo information can be magnetically recorded in the first magnetic area and information cannot be magnetically recorded in the first nonmagnetic area; and
        an initial positioning region having a second magnetic area and a second nonmagnetic area, wherein information for positioning at least one of the recording head and the reproduction head at a desired location in the mask pattern region is stored in the second magnetic area.

2. The magnetic recording device according to claim 1, wherein the mask pattern region and the initial positioning region are arranged in parallel in a diameter direction of the magnetic recording medium.

3. The magnetic recording device according to claim 2, wherein the initial positioning region is arranged parallel to the mask pattern region on any one of outside of the mask pattern region on an innermost circumference of the magnetic recording medium and outside of the mask pattern region on an outermost circumference of the magnetic recording medium.

4. The magnetic recording device according to claim 1, further comprising:
   a positioning unit that performs positioning of the recording head and the reproduction head on the magnetic recording medium;
   a reproducing unit that reproduces a reproduced signal that is read from the initial positioning region by the reproduction head after the reproduction head is positioned in the initial positioning region by the positioning unit; and
   a recording unit that causes the recording head to record servo information in the mask pattern region after the recording head is positioned in the mask pattern region by the positioning unit based on the reproduced signal generated in the initial positioning region.

5. The magnetic recording device according to claim 4, wherein the positioning unit measures a relative distance between the recording head and the reproduction head, moves the reproduction head by a moving distance obtained from a track width of the initial positioning region, moves the recording head by the relative distance, and positions the recording head in the mask pattern region.

6. The magnetic recording device according to claim 5, wherein the positioning unit positions the reproduction head at a center of a track of the initial positioning region, moves the recording head to the data region to record measuring data in the data region, moves the reproduction head to the data region to read the measuring data using the reproduction head, executes moving the reproduction head and reading the measuring data a plurality of times, and measures a relative distance between the reproduction head and the recording head based on the measuring data read the plurality of times.

7. The magnetic recording device according to claim 6, wherein the positioning unit calculates the relative distance using an approximation function preset based on track information.

8. The magnetic recording device according to claim 1, wherein the initial positioning region is configured so that the second magnetic area and the second nonmagnetic area are formed in an equal phase pattern to a phase pattern of a part of tracks of the mask pattern region to correspond to the part of tracks of the mask pattern region.

9. The magnetic recording device according to claim 8, wherein, when positioning the recording head on a track other than the track of the mask pattern region corresponding to the initial positioning region, the positioning unit performs positioning of the recording head based on the servo information already recorded in the mask pattern region.

10. The magnetic recording device according to claim 9, wherein the magnetic recording medium includes a burst preamble region that is provided as a continuous magnetic area, and synchronization information for reproducing the servo information recorded in the mask pattern region is recorded in the burst preamble region, wherein
   when recording the servo information in the mask pattern region, the recording unit records the synchronization information in the burst preamble region, and
   if the recording head is positioned on the track other than the track of the mask pattern region corresponding to the initial positioning region, the recording head records the servo information in the mask pattern region using the synchronization information recorded in the burst preamble region.

11. The magnetic recording device according to claim 10, wherein the magnetic recording medium includes
   an address region configured to store address information; and
   a preamble region configured to store the synchronization information, wherein
   the burst preamble region is provided between the mask pattern region and the address region and the preamble region.

12. The magnetic recording device according to claim 1, wherein the data region includes a discrete region, the discrete region including a magnetic region in which data can be recorded using the recording head and a nonmagnetic region in which data cannot be recorded using the recording head, the nonmagnetic region being provided between each of a plurality of tracks on which the magnetic regions are present and a track adjacent to each of the plurality of tracks.

13. The magnetic recording device according to claim 12, wherein
   the data region includes a relative distance measuring region that is provided as a continuous magnetic area in the magnetic recording medium, and in which the measuring data can be recorded, and
   the positioning unit positions the reproduction head at a center of one track of the initial positioning region, moves the recording head to the relative distance measuring region to record the measuring data using the recording head, moves the reproduction head to the relative distance measuring region to read the measuring data using the reproduction head, executes moving the reproduction head and reading the measuring data a plurality of times, and measures a relative distance between the reproduction head and the recording head based on the measuring data read for the plurality of times.

14. A magnetic recording medium comprising:
   a data region configured to store data, wherein a recording head records data in the data region;
   a mask pattern region having a first magnetic area and a first nonmagnetic area formed in a predetermined pattern, wherein servo information can be magnetically recorded in the first magnetic area and information cannot be magnetically recorded in the first nonmagnetic area; and
   an initial positioning region having a second magnetic area and a second nonmagnetic area, wherein information for positioning at least one of the recording head and a reproduction head at a desired location in the mask pattern region is stored in the second magnetic area.

15. A servo information recording method comprising:
   positioning a reproduction head in an initial positioning region of a magnetic recording medium, the magnetic recording medium including
      a data region configured to store data, wherein a recording head records data in the data region;
      a mask pattern region having a first magnetic area and a first nonmagnetic area formed in a predetermined pattern, wherein servo information can be magnetically recorded in the first magnetic area and information cannot be magnetically recorded in the first nonmagnetic area; and
      an initial positioning region having a second magnetic area and a second nonmagnetic area, wherein information for positioning at least one of the recording head and a reproduction head at a desired location in the mask pattern region is stored in the second magnetic area;

reading information on the initial positioning region, and generating a reproduced signal using the reproduction head positioned in the initial positioning region;

positioning the recording head in the mask pattern region based on the reproduced signal generated in the initial positioning region; and recording the servo information in the mask pattern region using the recording head positioned in the mask pattern.

* * * * *